(12) United States Patent
Doner et al.

(10) Patent No.: US 10,036,428 B2
(45) Date of Patent: Jul. 31, 2018

(54) DRIVESHAFT WITH VENTED CV JOINT

(71) Applicant: Ford Global Technologies, LLC, Dearborn, MI (US)

(72) Inventors: Bradley W. Doner, Northville, MI (US); Chris Peter Nicholas, Milford, MI (US); Duane Allan Lewis, Westland, MI (US); Rakesh Sharma, Novi, MI (US); Brian John Brown, Clinton Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 123 days.

(21) Appl. No.: 15/232,104

(22) Filed: Aug. 9, 2016

(65) Prior Publication Data

US 2018/0045250 A1 Feb. 15, 2018

(51) Int. Cl.
*E21B 17/02* (2006.01)
*F16D 3/84* (2006.01)

(52) U.S. Cl.
CPC ........ *F16D 3/845* (2013.01); *F16D 2003/846* (2013.01); *Y10S 277/928* (2013.01); *Y10S 464/906* (2013.01); *Y10T 464/10* (2015.01)

(58) Field of Classification Search
CPC .............. F16D 3/845; F16D 2003/846; Y10S 277/928; Y10S 464/906; Y10T 464/10
USPC ..................................... 464/17, 19; 277/928
See application file for complete search history.

(56) References Cited

U.S. PATENT DOCUMENTS

| 2,147,491 | A | * | 2/1939 | Le Bus | ..................... E21B 7/06 464/19 X |
| 4,319,467 | A | * | 3/1982 | Hegler | ..................... F16D 3/84 277/928 |
| 5,772,520 | A | | 6/1998 | Nicholas et al. | |
| 6,540,616 | B2 | | 4/2003 | Miller et al. | |
| 7,097,563 | B2 | | 8/2006 | Benson et al. | |
| 8,721,461 | B2 | | 5/2014 | LaMothe et al. | |

* cited by examiner

*Primary Examiner* — Gregory Binda
(74) *Attorney, Agent, or Firm* — James Dottavio; Brooks Kushman P.C.

(57) ABSTRACT

A driveshaft includes a shaft defining a passageway and a constant velocity joint defining an interior and having a cover defining a hole. A grommet is disposed in the hole and defines a fluid passage into the interior. The CV joint is coupled to the shaft such that the shaft is disposed against the grommet with the passageway and the fluid passage in fluid communication to vent air from the interior into the passageway.

18 Claims, 5 Drawing Sheets

US 10,036,428 B2

DRIVESHAFT WITH VENTED CV JOINT

TECHNICAL FIELD

This disclosure relates to constant velocity joints for motor vehicles.

BACKGROUND

Constant velocity joints (CV joints) are used to transmit power between adjoining shafts at a constant velocity. CV joints are commonly used on vehicle drivetrain components such as the propeller shaft that transmits power between the transmission and the rear wheels, and the front half shafts of a front-wheel-drive vehicle. Common types of CV joints include a plunging tripod, a fixed tripod, a plunging-ball joint, and a fixed-ball joint. These common types of CV joints can be mono-block style or disk style.

CV joints are lubricated with grease and are sealed with a boot. CV joints are typically not serviceable and are lubricated at the factory for life of the part. The grease and the boot cooperate to lubricate the joint while keeping contaminants such as dirt and water out of the joint.

During operation, internal pressures are generated within the inner chamber of the CV joint. These pressures are vented to the outside air in order to prevent pressure buildup which may destroy the boot. Existing venting solutions include forming a hole in the grease cap to allow pressure to release from the inner chamber to the outside air. Because the hole is exposed to the elements, water and other contaminants may pass through the hole and into the inner chamber causing premature failure of the CV joint.

This disclosure is directed to the above challenges and other challenges as summarized below.

SUMMARY

According to one embodiment, a shaft assembly for a vehicle includes a first shaft defining a passageway therein. A nipple is disposed on an end surface of the first shaft and is in fluid communication with the passageway. A constant velocity joint connects the first shaft to a second shaft. The constant velocity joint includes an inner race disposed on the second shaft, an outer race cooperating with the inner race to define an interior, and roller elements engaging between the races. A cover encloses the interior and defines a hole. A grommet is disposed in the hole and defines an orifice opening into the interior. The constant velocity joint is coupled to the first shaft such that the nipple is received within the orifice allowing air within the interior to vent into the passageway.

According to another embodiment, a driveshaft includes a shaft defining a passageway and a constant velocity joint having inner and outer races defining an interior and a cover defining a hole. A grommet is disposed in the hole and defines a fluid passage into the interior. A nipple is connected to the shaft with a stub of the nipple disposed in the passageway. The CV joint is coupled to the shaft with the nipple disposed within the fluid passage to vent air from the interior into the passageway.

According to yet another embodiment, a driveshaft includes a shaft defining a passageway and a constant velocity joint defining an interior and having a cover defining a hole. A grommet is disposed in the hole and defines a fluid passage into the interior. The CV joint is coupled to the shaft such that the shaft is disposed against the grommet with the passageway and the fluid passage in fluid communication to vent air from the interior into the passageway.

DETAILED DESCRIPTION

As required, detailed embodiments of the present invention are disclosed herein; however, it is to be understood that the disclosed embodiments are merely examples of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
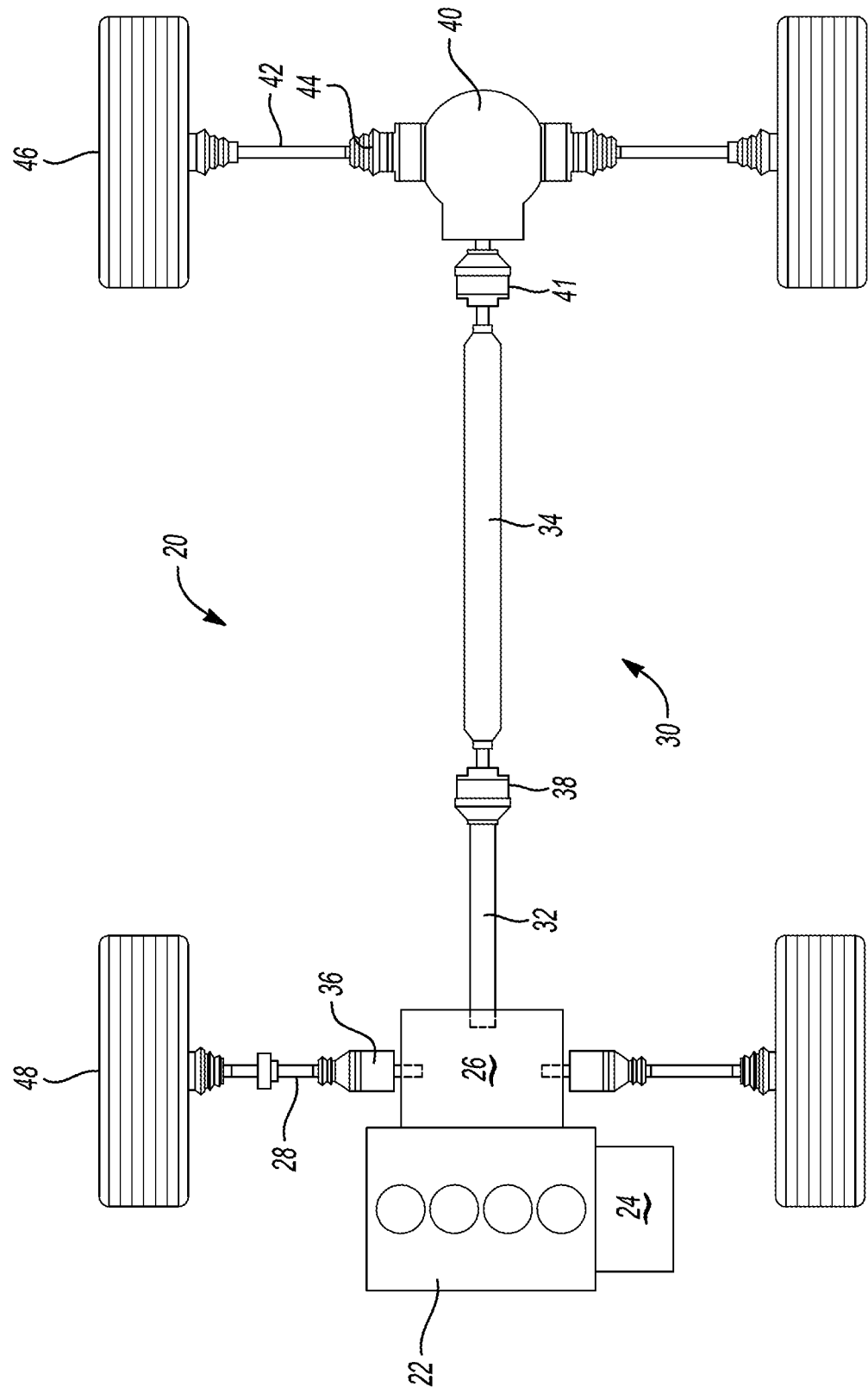
FIG. 1 is a schematic diagram of an example vehicle.

FIG. 1 illustrates an example all-wheel-drive vehicle 20. Is to be understood, however, that the teachings of this disclosure are equally applicable to rear-wheel-drive vehicles and front-wheel-drive vehicles. The vehicle 20 includes an engine 22 connected to a transmission 24 and a power takeoff unit 26. The power takeoff unit 26 selectively transfers power to the front half shafts 28 and the propeller shaft 30. The front half shafts 28 (also generically referred to as a driveshaft) power the front wheels 48, and the propeller shaft 30 (also generically referred to as a driveshaft) powers the rear wheels 46. Each of the front half shafts 28 may include at least one CV joint 36. The propeller shaft 30 may include a first shaft 32 connected to the power takeoff unit 26, and a second shaft 34 connected to the rear differential 40. The first and second shafts may be connected by a CV joint 38. The second shaft 34 may be connected to the differential via a CV joint 41. A pair of rear half shafts 42 (also generically referred to as a driveshaft) connect between the differential 40 and the rear wheels 46. Each of the rear half shafts 42 may include at least one CV joint 44. As used herein, "driveshaft" refers to any assembly of one or more shafts that transmits power from a power source (e.g., an engine) to a driven component (e.g., a differential, or wheels). Example driveshafts include: a propeller shaft, a front half shaft, a rear half shaft, and the like.

Figure 2:
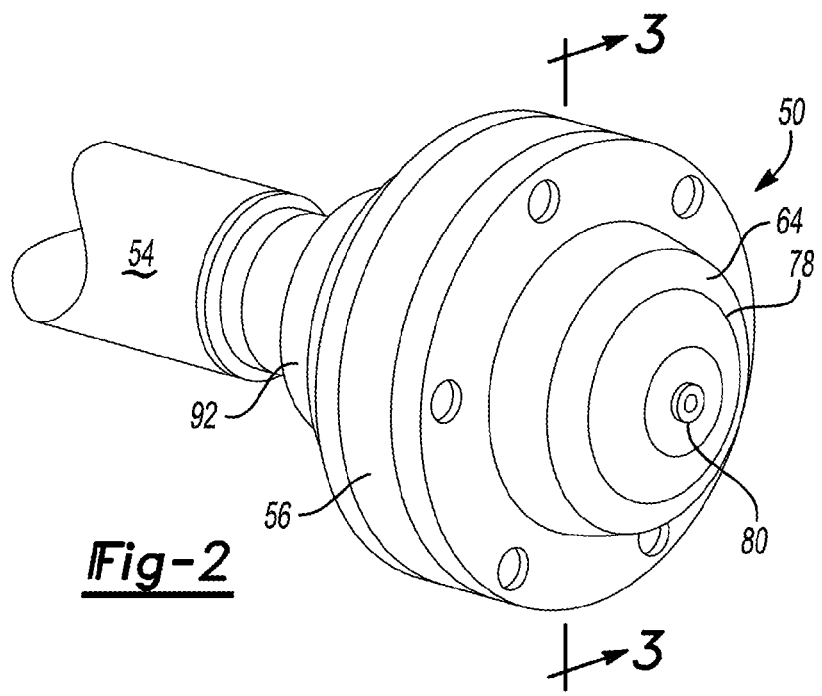
FIG. 2 is a perspective view of a CV joint for the vehicle of FIG. 1.
Figure 3:
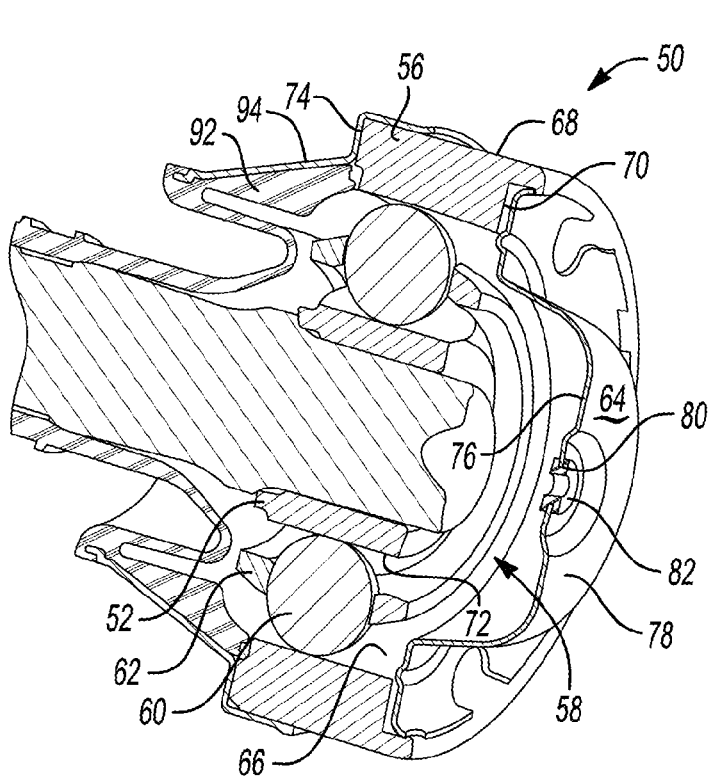
FIG. 3 is a cross-sectional view of the CV joint along cutline 3-3.
Figure 4:
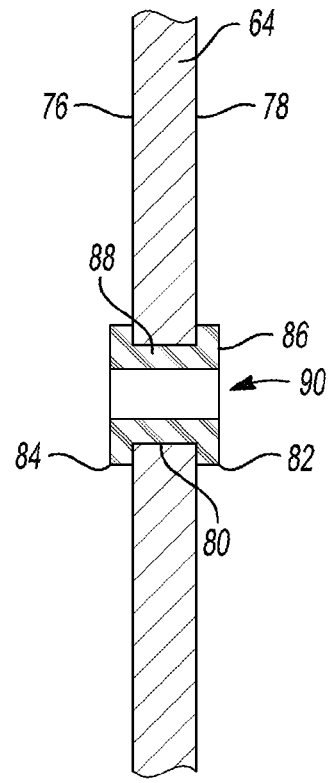
FIG. 4 is a partial side view, in cross section, showing the cover and the grommet of the CV joint of FIG. 2.

FIGS. 2 through 7 describe an example CV joint 50 that could be used on the vehicle 20. One or more of the CV joints 36, 38, or 44 include the disclosed features of CV joint 50. Referring to FIGS. 2, 3 and 4, the CV joint 50 includes an inner race 52 disposed on a first shaft 54. The first shaft 54 may be a shaft of the propeller shaft 30, the front half shaft 28, or the rear half shaft 42. The CV joint 50 also includes an outer race 56 that connects to a second shaft. An outer surface 72 of the inner race 52 and an inner surface 66 of the outer race 56 cooperate to partially define an interior 58. A plurality of rolling elements 60, such as metal balls, engage between the inner and outer races. The balls 60 are held in place by a cage 62. Rotation of the outer race 68 rotates the inner race 52 at the same or constant speed thus allowing constant velocity to flow through the joint between the shafts while permitting angular movement between the shafts via the balls 60.

A cover 64 is connected to a front face 70 of the outer race 56 to enclose a portion of the interior 58. The cover 64 includes an interior surface 76 disposed against the front face 70 and an exterior surface 78 facing away from the CV joint. A hole 80 is defined in the cover 64 and extends between the interior and exterior surfaces 76, 78. A grommet 82 is disposed within the hole 80. The grommet 82 may be an elastomeric material that creates a seal with the cover. The grommet 82 includes an inner flange 84 within the interior 58 and disposed against the interior surface 76, and an outer flange 86 disposed against the exterior surface 78. A tubular barrel 88 extends between the inner and outer flanges 84, 86. The tubular barrel 88 defines an orifice or fluid passage 90 in fluid communication with the interior 58. The orifice 90 permits air pressure within the interior 58 to vent out of the CV joint 50. A boot 92 seals the other side of the interior 58. A boot cover 94 secures the boot 92 to the rear face 74 of the outer race 56. A clamp (not shown) secures the boot to the shaft 54.

Figure 5:
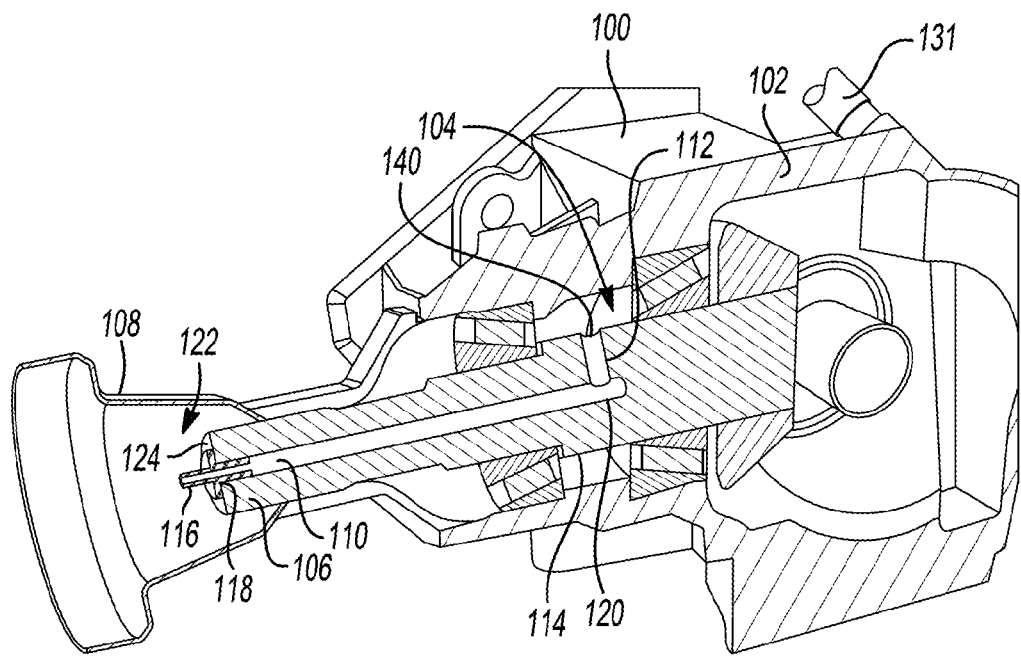
FIG. 5 is a schematic cross-sectional view of a driveline component.
Figure 6:
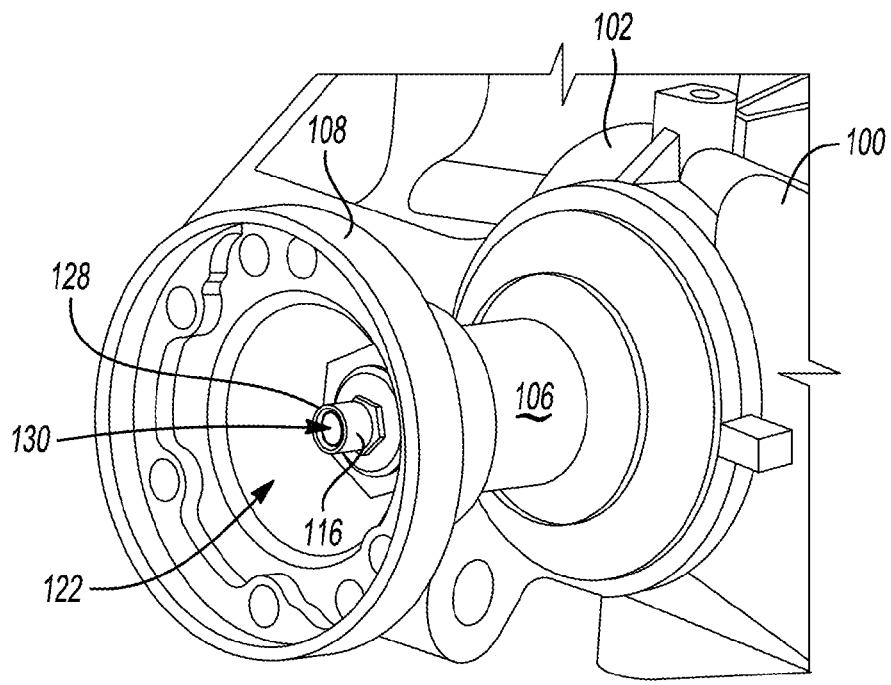
FIG. 6 is a perspective view of a shaft associated with the driveline component.
Figure 7:
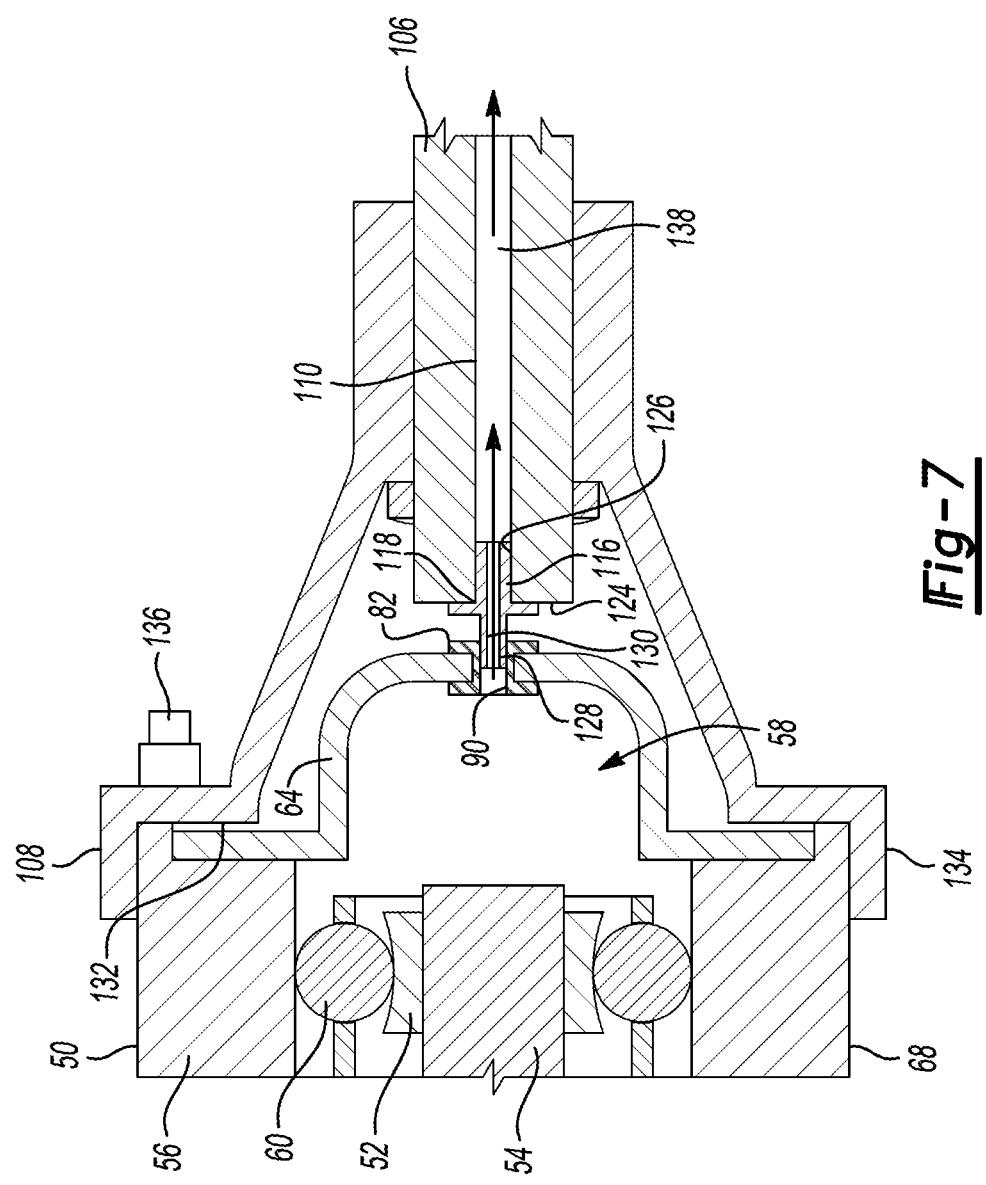
FIG. 7 is a partial cross-sectional view of a driveshaft including the CV joint of FIG. 2.

Referring to FIGS. 5, 6 and 7, a driveline component 100 (such as power takeoff unit 26, transmission 24, or differential 40) includes a housing 102 that defines an interior 104. Gears and other components may be disposed within the interior 104 depending upon the specific type of driveline component. A shaft 106 extends into the housing 102 and includes a portion disposed within the interior 104. The shaft 106 may include a cup flange 108 that connects with the CV joint 50. The cup flange 108 defines an interior 122 that receives a portion of the CV joint 50 including the cover 64 and the grommet 82. The shaft 106 defines a passageway 110 extending axially from an end face 124 of the shaft towards the component 100. The passageway 110 may extend along a center line of the shaft. The passageway 110 may be formed by drilling a bore in the shaft. The passageway 110 has a distal end 118 defined in the end face 124, and a proximal end 120 disposed within the interior 104. An orifice 112 extends between an outer surface 114 of the shaft and the passageway 110. The orifice 112 allows air to vent from the passageway 110 into the interior 104 of the driveline component. The orifice 112 may be a bore drilled in the shaft.

A nipple 116 is disposed on the end face 124 with a stub 126 disposed in the distal end 118 of the passageway 110. The stub 126 may include threads that screw into a tapped portion of the passageway 110. The nipple 116 includes a tip 128 that is received within the grommet 82 when the CV joint 50 is connected to the cup flange 108. The nipple 116 defines an orifice 130 allowing fluid flow through the nipple. The nipple 116 may be formed of metal, plastic, or other material. The hardness of the nipple may exceed the hardness of the grommet allowing the nipple to be inserted into the grommet more easily when the CV joint 50 is coupled to the cup flange 108. The nipple 116 connects the interior 58 of the CV joint 50 in fluid communication with the passageway 110 allowing air pressure within the CV joint 50 to vent into the driveline component 100. The driveline component 100 may include an air vent to the outside air. For example, a hose 131 connects the interior 104 of the housing 102 in fluid communication with the outside air.

The CV joint 50 connects shaft 54 to shaft 106. The CV joint 50 may be fastened to the cup flange 108 via one or more fasteners 136. The cover 64 and/or the outer race 56 may be disposed against an engaging surface 132 of the flange 108. The flange may have a lip 134 engaging with an outer surface 68 of the outer race. The nipple 116 is positioned in the interior 122 such that the tip 128 extends into the orifice 90 of the grommet 82 when the CV joint 50 is fastened to the cup flange 108. The CV joint interior 58, the orifice 90, the orifice 130, and the passageway 110 are all in fluid communication with each other when the nipple 116 is received within the grommet 82. This creates a fluid-flow path 138 from the interior 58 of the CV joint to the interior 104 of the driveline component permitting air pressure within the interior 58 to vent into the interior 104.

The grommet 82 creates a water-tight seal on the tip 128 preventing contaminates such as water and dirt from entering the CV joint. The interior 104 of the housing 102 is also water tight. Thus, unlike previous CV joint designs, the open end 140 of the fluid-flow path 138 is located in a protected environment that is substantially free of contaminates. Placing the open end 140 in a projected environment eliminates the need for a one-way valve to prevent contaminates from entering the CV joint. The proposed venting solution is more robust than one-way valve designs because the potential for valve failure is eliminated.

Figure 8:
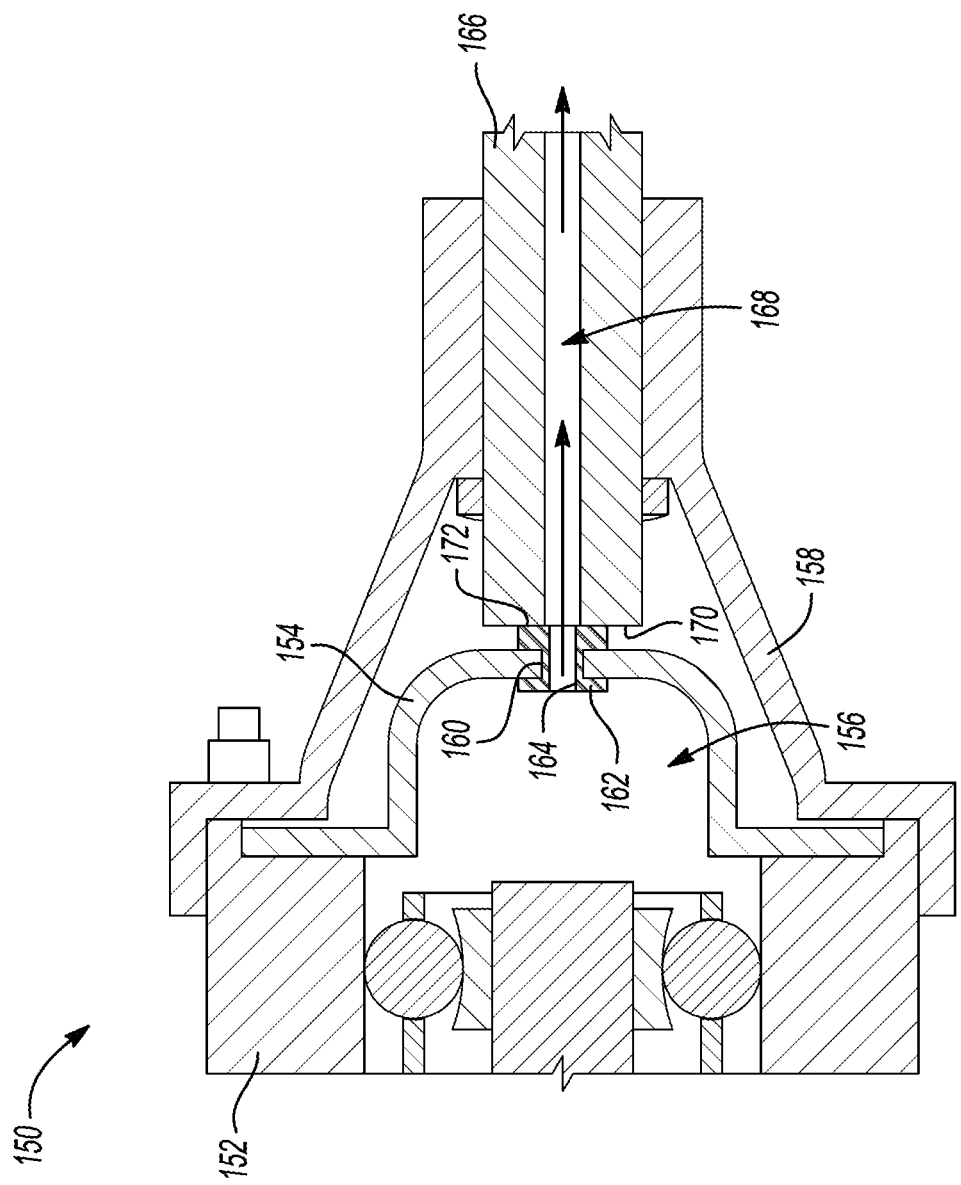
FIG. 8 is a cross-sectional view of a CV joint and shaft assembly according to one embodiment.

Referring to FIG. 8, a CV joint and shaft assembly 150 includes a CV joint 152 that may be of similar construction to CV joint 50. The CV joint 152 includes a cover 154 that cooperates with the inner and outer races to define an interior 156. The cover 154 extends forward from the CV joint and is disposed within an interior of the cup flange 158. The cover defines a hole 160 extending between the interior and exterior surfaces of the cover. A grommet 162 is disposed within the hole 160. The grommet 162 may be an elastomeric material that creates a seal with the cover. The grommet 162 defines an orifice or fluid passage 164 in fluid communication with the interior 156. The orifice 164 permits air pressure within the interior 156 to vent out of the CV joint 152.

The cup flange 158 is disposed on a shaft 166 that connects to a driveline component such as a PTO or a differential. The shaft 166 defines a passageway 168 that is connected in fluid communication with an interior of the driveline component. The CV joint 152, the cup flange 158, and the shaft 166 are arranged such that a distal end 170 of the shaft 166 is disposed against an outer surface 172 of the grommet 162 with the orifice 164 aligned, and in fluid communication, with the passageway 168. This allows air pressure within the CV-joint interior 156 to vent through the cover, into the passageway, and finally to the driveline component.

While example embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A driveshaft comprising:
a shaft defining a passageway;
a nipple having a stub disposed in the passageway;

a constant velocity joint including inner and outer races defining an interior, and a cover defining a hole; and a grommet disposed in the hole and defining a fluid passage into the interior, wherein the nipple extends into the hole and is disposed within the fluid passage to vent air from the interior into the passageway.

2. The driveshaft of claim 1, wherein the grommet is formed of an elastomeric material.

3. The driveshaft of claim 1, wherein the shaft further includes a proximal end disposed within a driveline component, and a distal end having the nipple disposed thereon.

4. The driveshaft of claim 3, wherein the passageway extends axially from the distal end towards the proximal end.

5. The driveshaft of claim 4, wherein the shaft defines an orifice extending from an outside surface of the shaft to the passageway, and wherein the orifice is disposed within the driveline component allowing air to vent from the constant velocity joint to the driveline component.

6. The driveshaft of claim 3, wherein the driveline component is a power-takeoff unit.

7. The driveshaft of claim 1, wherein the shaft includes a flange defining an interior, and the nipple and the cover are disposed within the interior.

8. The driveshaft of claim 1, wherein the grommet further includes an inner flange disposed against an inside surface of the cover, an outer flange disposed against an outside surface of the cover, and a tubular barrel connecting between the flanges and extending through the hole, wherein the nipple includes a tip received within the tubular barrel.

9. The driveshaft of claim 1, wherein the inner race is disposed on a second shaft.

10. A driveshaft comprising:
a shaft having an end face and defining a passageway extending from the end face in an axial direction of the shaft;
a constant velocity joint defining an interior and including a cover defining a hole; and
a grommet disposed in the hole and defining a fluid passage into the interior, wherein the joint is coupled to the shaft such that the end face is disposed against the grommet with the passageway and the fluid passage in fluid communication to vent air from the interior into the passageway.

11. The driveshaft of claim 10 further comprising a nipple having a first end attached to the shaft and a second end disposed in the grommet, wherein the nipple defines an orifice that connects the passageway and the fluid passage in fluid communication.

12. The driveshaft of claim 10, wherein the shaft further includes a proximal end disposed within a driveline component having an interior that is in fluid communication with the interior via the passageway and the fluid passage.

13. A shaft assembly for a vehicle comprising:
a first shaft defining a passageway therein;
a nipple disposed on an end surface of the first shaft and in fluid communication with the passageway; and
a constant velocity joint including
an inner race disposed on a second shaft,
an outer race cooperating with the inner race to define an interior,
roller elements engaging between the races,
a cover enclosing the interior and defining a hole, and
a grommet disposed in the hole and defining an orifice opening into the interior, wherein the grommet further includes an inner flange disposed against an inside surface of the cover, an outer flange disposed against an outside surface of the cover, and a tubular barrel connecting between the flanges and extending through the hole, wherein the orifice extends through the barrel and the flanges; wherein
the constant velocity joint is coupled to the first shaft such that the nipple is received within the orifice allowing air within the interior to vent into the passageway.

14. The shaft assembly of claim 13, wherein the nipple further includes a tip disposed within the barrel.

15. The shaft assembly of claim 13, wherein the first shaft further includes a cup flange defining a flange interior, and wherein the outer race is attached to the cup flange such that the cover is disposed in the flange interior.

16. The shaft assembly of claim 13, wherein the first shaft defines a second orifice in fluid communication with the passageway, and wherein a portion of the first shaft is received within a housing of a driveline component such that the second orifice is disposed within an interior of the housing allowing the passageway to vent into the housing.

17. The shaft assembly of claim 16, wherein the driveline component is a power-takeoff unit.

18. The shaft assembly of claim 13, wherein the grommet is formed of an elastomeric material.

* * * * *